(No Model.)
J. W. FAWCETT.
MEANS FOR REGULATING RAYS OF LIGHT PASSING THROUGH PHOTOGRAPHIC LENSES.
No. 516,861.  Patented Mar. 20, 1894.
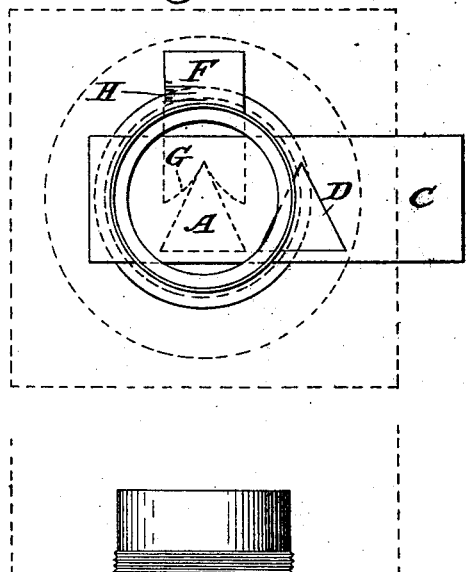
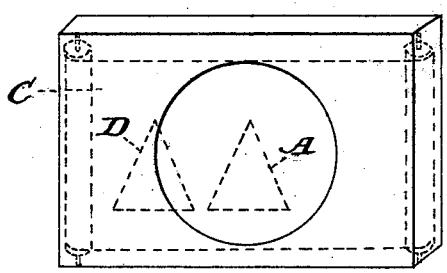
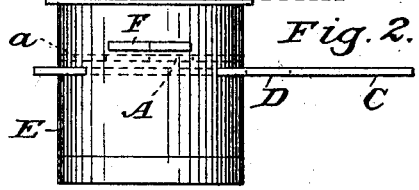
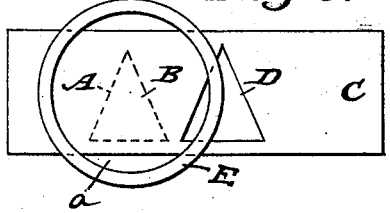
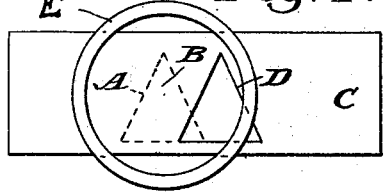
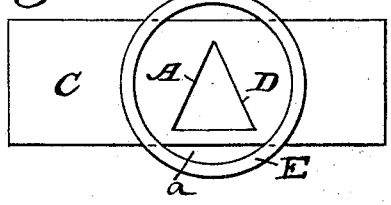
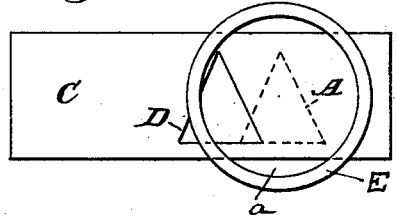
WITNESSES:  INVENTOR
E. B. Bolton  James William Fawcett
M. Supple  BY
ATTORNEYS
THE NATIONAL LITHOGRAPHING COMPANY,
WASHINGTON, D. C.

UNITED STATES PATENT OFFICE.

JAMES WILLIAM FAWCETT, OF ST. KILDA, VICTORIA.

MEANS FOR REGULATING RAYS OF LIGHT PASSING THROUGH PHOTOGRAPHIC LENSES.

SPECIFICATION forming part of Letters Patent No. 516,861, dated March 20, 1894.

Application filed July 14, 1893. Serial No. 480,521. (No model.)

*To all whom it may concern:*

Be it known that I, JAMES WILLIAM FAWCETT, civil engineer, a subject of the Queen of Great Britain and Ireland, and a resident of "Berthanga," No. 15 Argyle Street, St. Kilda, near Melbourne, in the British Colony of Victoria, have invented a certain new and useful Improved Means for Regulating the Rays of Light Passing Through Photographic Lenses, of which the following is a specification.

With the means at present in use for regulating the rays of light passing through photographic lenses, it has been usual to make the apertures in the stops and shutters in a line or concentric with the optic centers of said lenses. With this construction, however, the major portion of the rays of light passes on to the sensitive plate from the sky or upper portion of the landscape, while only a small portion passes from the foreground, the effect upon such plate being unequal, so that it has been found to be impossible under ordinary conditions to correctly photograph clouds and other aerial effects at the same time as the foreground or main part of the land or seascape.

Now the object of this invention is chiefly to enable these results to be obtained, and partly to impart a stereoscopic effect to the photograph.

It consists in arranging the apertures in the diaphragms, stops and shutters of photographic lenses so that their larger area is below the optic center of the lens, thereby allowing a greater proportion of light to pass from the foreground on to the sensitive plate than from the sky, thus tending to equalize the effect upon the plate, as will be well understood by photographers.

According to my invention, I make the lens aperture of triangular or approximately triangular shape, with the base arranged horizontally, and I cut a similarly shaped opening in a horizontally sliding plate or shutter, which may be actuated by hand or by any other convenient means. By forming the aperture in the horizontally sliding plate or shutter, as just described, and by sliding it horizontally, a stereoscopic effect is given to the finished photograph by reason of the light being allowed to enter first at one bottom corner, then gradually being allowed to pass through the whole of the lens aperture, and finally through a small opening at the opposite bottom corner, thus as it were to a certain extent photographing the object from two different points of view, and so producing the desired effect. In order to reduce the size of this lens aperture, a plate having a triangular or approximately triangular hole or notch cut in its lower end may be arranged to slide vertically through a slot in the brass mount of the lens in the same way as the ordinary stops, said plate being capable of adjustment to any required position so as to cut off more or less of the upper part of the lens aperture. I prefer to make the lens aperture in the form either of an equilateral or else of an acute angled isosceles triangle, and arrange it so that two-thirds of its height is below the optic center. The principle of construction above described can be applied to detachable, instantaneous, or other shutters, such as are usually fitted upon the forward part of the lens.

Referring to the accompanying drawings: Figure 1 is a front elevation of a photographic lens fitted with my improvement, while Fig. 2 is a plan thereof. Figs. 3 to 6 are diagrammatic views illustrating its operation, and Fig. 7 is a front elevation of a detached shutter, constructed according to this invention.

The same letters of reference indicate the same or corresponding parts in all the figures.

A represents the aperture in the diaphragm a, which aperture is, according to this invention, so arranged that its major portion is below the optic center B of the lens. By preference I make this opening in the form either of an equilateral or else of an acute angled isosceles triangle, and arrange it so that only one-third of its height projects above said optic center B, thus leaving but a very small area above said center, and placing the largest area below. The shutter C is made with a corresponding aperture D, and is arranged to slide horizontally through the usual metallic mounting E of the lens. Said shutter can be worked either mechanically or by hand, as preferred.

F represents a stop or plate, having its lower end cut out in an approximately triangular shape, as illustrated at G in Fig. 1. This stop is graduated, as illustrated at H in said figure, so as to indicate the size of the lens aperture, when said stop is fixed at any given height. It is used in the same way and for the same purpose as the ordinary graduated stops. I prefer to notch the lower end of the stop F with curved sides, as shown, instead of straight, because it will then more gradually regulate the amount of light passing through the two lower corners of the lens aperture.

With a lens and shutter constructed as above described, it will be evident that the major portion of the light will pass through the lower part of the lens and be directed on to the upper part of the sensitive plate, while a smaller proportion will be directed on to the lower part of the plate. Moreover, as indicated in Fig. 4, as the shutter C is moved, one corner of the aperture D will first pass over the adjacent corner of the aperture A, leaving a small triangular aperture for the passage of the light on one side and below the optic center of the lens. Then, as said shutter continues to be moved, the full aperture through the lens will be uncovered, as indicated in Fig. 5, and finally as the aperture D is moved to the opposite side it will gradually reduce the size of the lens aperture, until finally there is but a very small passage for the rays of light on the opposite side to the one on which the opening was first exposed. This operation will be clearly understood on reference to Figs. 4, 5 and 6, and the effect of such operation will be as it were to partially photograph the view from two different standpoints, the final result being to produce a photograph having a peculiarly sharp stereoscopic effect, which greatly enhances its interest and beauty.

If preferred, the novel principle of construction above described can be used for detachable shutters, such as are fitted upon one or other end of the lens, and are usually actuated instantaneously by means of a spring, compressed air, or otherwise. In the example of such a shutter illustrated in Fig. 7, the aperture A is made triangular or approximately triangular, and the aperture D in the traveling band C is made of a corresponding shape, while said band is made to travel horizontally across the diaphragm either by means of a coiled spring released by a catch or by any other convenient means, such as are commonly in use with instantaneous shutters. By this means the results above described can be obtained.

Having now particularly described and ascertained the nature of my said invention and in what manner the same is to be performed, I declare that what I claim is—

1. In means for regulating the rays of light passing through photographic lenses, the combination with the fixed lens diaphragm having a triangular or approximately triangular opening the larger area of which is below the optic center of the said lens and the sliding shutter having an opening and arranged to slide over the diaphragm opening to obtain a stereoscopic effect in connection therewith, substantially as described.

2. In means for regulating the rays of light passing through photographic lenses, the combination with a fixed lens diaphragm having a triangular or approximately triangular opening and its larger area below its optic center, of a horizontally sliding shutter formed with a correspondingly shaped aperture, also similarly arranged so that its larger area is below said optic center, substantially as and for the purposes specified.

3. In means for regulating the rays of light passing through photographic lenses, the fixed diaphragm having a substantially triangular aperture a vertically adjustable stop, having a notch in its lower end and adapted to be raised so as to cover more or less of the upper part of the triangular aperture in the diaphragm, substantially as and for the purposes specified.

4. In means for regulating the rays of light passing through photographic lenses, a fixed diaphragm having a triangular or approximately triangular aperture arranged with its larger area below the optic center of the lens in combination with the horizontally sliding shutter formed with a correspondingly shaped aperture and the adjustable stop having a triangular shaped notch in its lower end, and adapted to cut off or reduce the size of the lens aperture substantially as and for the purposes specified.

In witness whereof I have hereunto set my hand in presence of two witnesses.

JAMES WILLIAM FAWCETT.

Witnesses:
EDWARD WATERS,
EDWARD NEEDHAM WATERS.